United States Patent [19]

Golden et al.

[11] 4,287,096

[45] Sep. 1, 1981

[54] PROCESS FOR PRODUCING SUPPORTED SKELETAL CATALYTIC MATERIALS

[75] Inventors: Gerald S. Golden; Franklin D. Lemkey, both of Windsor; Clyde S. Brooks, Glastonbury, all of Conn.

[73] Assignee: United Technologies Corporation, Hartford, Conn.

[21] Appl. No.: 131,299

[22] Filed: Mar. 18, 1980

[51] Int. Cl.³ .................... B01J 21/04; B01J 21/08; B01J 21/12; B01J 35/04
[52] U.S. Cl. .................... 252/455 R; 252/454; 252/463; 252/477 Q
[58] Field of Search ............... 252/477 Q, 454, 455 R, 252/463, 466 PT

[56] References Cited

U.S. PATENT DOCUMENTS

| | | | |
|---|---|---|---|
| 2,384,501 | 9/1945 | Streicher | 252/477 Q |
| 3,657,157 | 4/1972 | Pieters et al. | 252/477 Q |
| 4,021,371 | 5/1977 | Petró et al. | 252/475 X |

FOREIGN PATENT DOCUMENTS 1170698  11/1969  United Kingdom ............... 252/477 Q

*Primary Examiner*—W. J. Shine
*Attorney, Agent, or Firm*—Charles E. Sohl

[57] ABSTRACT

A method for producing a supported skeletal catalyst is described. The starting material is an alloy which consists of an aluminum or silicon matrix containing fine particles of an intermetallic compound between the matrix material and a catalytically active metal. Chemical means are used to convert the matrix material to an oxide ceramic while removing the matrix material from the intermetallic particles.

3 Claims, 1 Drawing Figure

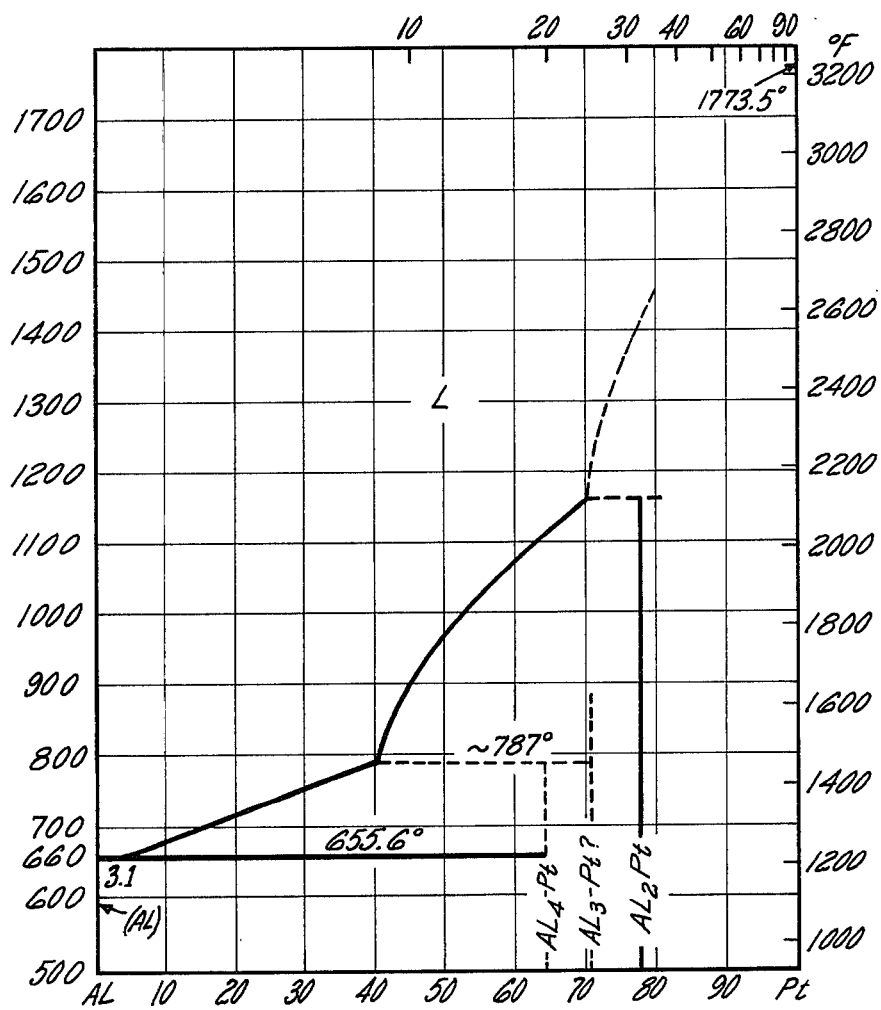

PROCESS FOR PRODUCING SUPPORTED SKELETAL CATALYTIC MATERIALS

TECHNICAL FIELD

This invention is concerned with supported skeletal catalytic materials and methods for producing them. The catalytic materials of the present invention consist of small particles of skeletal RANEY-type materials dispersed within a porous oxide material.

BACKGROUND ART

A substantial amount of research and development effort is being devoted to the development and improvement of catalytic materials. Catalytic materials offer substantial improvements in the efficiency of the various chemical processes.

A primary objective in the development of catalytic materials is the maximization of catalytic specific surface area (catalyst area/mas). A primary method of obtaining such increased surface area is through the use of the RANEY process. In this process intermetallic compounds are employed as a starting material. The compounds contain the desired catalytic element and a less noble constituent. Through a chemical leaching process, the less noble constituent is removed leaving behind a skeletal array of the catalytic material. The resultant skeletal array has an exceptionally high specific surface area. Typical of such an approach is the production of skeletal nickel catalysts starting from an aluminum nickel compound such as $Al_3Ni$ and using a caustic solution such as NaOH to remove a large portion of the aluminum from the compound leaving behind a nickel skeletal material having a high catalytic effectiveness.

For many applications, it is desirable to have the catalysts which are durable and long lived at elevated temperatures. For such applications, it is known to start with porous ceramic material and impregnate this material with a compound of a catalytically active metal and then to cause the decomposition of this compound to leave behind the metal in a catalytically effective form. Typical of such catalysts are those prepared by the impregnation of porous alumina with a solution of chloroplatinic acid followed by a thermal treatment to decompose the acid to leave behind a residue of catalytically effective platinum.

Another approach to catalyst preparation is described in U.S. Pat. No. 4,021,371. In this patent, an alloy between a catalytically active metal and a less noble metal is provided (for example, aluminum - 16% nickel). This material is pulverized and then treated with a caustic material such as an alkali metal hydroxide in an amount of from 0.01 to 2 times the stoichiometric amount with respect to the noncatalytic alloy component. This treatment produces a powder of compounds such as sodium aluminate and hydrated aluminum oxides when an aluminum containing alloy is treated with sodium hydroxide. Also contained within this powder is the catalytically active material in the form of paticles of an intermetallic compound. The caustic treatment is also effective in removing a portion of the catalytic material from these intermetallic particles. The resultant powder is washed until neutral and then dried at a temperature below about 100° C. The resultant material is then used as a catalyst.

It is an object of this invention to provide a supported skeletal catalytic material by the chemical treatment of alloys between the catalytic material and a less noble metal such as aluminum and silicon.

It is a further object of the invention to produce supported skeletal catalytic materials which are effective at temperatures exceeding 600° C.

DISCLOSURE OF INVENTION

The present invention includes supported skeletal catalytic materials which comprise discrete particles of skeletal metal catalysts dispersed in a porous oxide ceramic support.

The invention also includes the method of making such supported catalytic materials starting with an alloy between a less noble metal such as aluminum and silicon and a catalytic metal such as the transition metals and rare earth metals. The starting alloy contains particles of an intermetallic compound between the less noble material and the catalytically active material which are dispersed in a matrix of the less noble material. The starting alloys are treated with a basic solution which dissolves the matrix and removes at least a portion of the less noble material from the intermetallic particles, leaving the skeletal intermetallic particles in a solution of the compound which results from the dissolution of the matrix. This solution is treated with an acid material to produce a gel which is then dehydrated and calcined in a reducing atmosphere at an elevated temperature to produce a material which comprises skeletal metal particles of catalytically active material dispersed in an oxide ceramic matrix based on the material which formed the matrix of the starting alloy.

BRIEF DESCRIPTION OF THE DRAWING

The drawing shows a portion of the aluminum-platinum phase diagram.

BEST MODE FOR CARRYING OUT THE INVENTION

The starting material employed with the present invention is an alloy between the desired catalytic material and a less noble metal. The alloy composition is selected so that the catalytic material appears in the form of particles of an intermetallic compound comprised of the catalytic material and the less noble material surrounded by a matrix of the less noble material. A wide variety of alloys may be employed as starting materials. Preferred matrix materials include aluminum and silicon. These materials are preferred since the oxide ceramics based on these materials (alumina and silica) have good elevated mechanical properties and stability.

Metals which have useful catalytic activity include Ni, Pt, Os, Pd, Ru, Re, Rh, Au, Ir, Co, Fe, Mo, Cu and Ag. All of these catalytically active metals may not have utility with both of the previously mentioned matrix materials. A determination of the suitability of a particular catalytic material and a particular matrix may be obtained by consideration of the readily available compilations of phase diagrams. For example, the figure shows the phase diagram of the aluminum-platinum system. A eutectic occurs at 3.1 weight percent Pt and peritectics occur at 40 weight percent Pt and 70 weight percent Pt. Compositions containing up to about 64% Pt will consist of one or more species of aluminum-platinum intermetallics in an aluminum matrix. For compositions containing up to 40 weight percent Pt the intermetallic will be $Al_4Pt$ while for compositions up to 64% Pt the intermetallic compounds will be a mixture of Al$_4$Pt and Al$_3$Pt. It is generally observed that the highest specific catalytic activity is observed in skeletal catalytic materials derived from intermetallic compounds containing a highest fraction of the less noble metals in relation to the catalytic material. Thus, catalytic material derived from Al$_4$Pt will probably be more active than material derived from Al$_3$Pt. For this reason, it is preferred that the catalytic material and the matrix material form a eutectic in the vicinity of the less noble end of the phase diagram. It is further preferred to operate within this eutectic range so that the resultant catalyst may have maximum activity.

This invention also contemplates the use of alloy matrices and alloy catalytic materials. For example, a starting alloy of aluminum and silicon plus platinum might be used to produce a mullite support material containing dispersed skeletal Pt particles. Likewise, in the area of catalysis, it has been observed that for certain reactions alloy catalysts such as an alloy of platinum and rhodium is more effective and this invention can be used to develop alloy catalysts as well as eutectic metal catalysts. In the case of Pt and Rh, which have very similar phase diagrams with aluminum, a mixture of 3% Pt plus 3% Rh plus 94% Al could be used to produce a Pt plus Rh alloy catalyst dispersed in alumina.

The process of the invention includes providing an alloy of the type previously described in a form in which the intermetallic particles are fine and well dispersed. Such an alloy condition may be developed by a rapid solidification technique since it is generally observed that the fineness of a solidified structure is proportional to the solidification rate. High solidification rates may readily be achieved in powdered materials and such powdered materials are advantageously used in the present invention since their high surface area permits rapid chemical dissolution.

Having provided the starting material in the previously described form, the first step in the invention is to dissolve the matrix material and to remove as large a fraction as possible of the matrix element from the intermetallic compound. This step is effected by treatment with a caustic solution. The result of such a caustic solution is to form a compound between the caustic material cation and the matrix material.

It is a necessary part of this invention that the resultant compound be in solution in the presence of excess caustic and excess water at the conclusion of the treatment. Concurrent with this treatment hydrogen is evolved. At the conclusion of the treatment, the solution will contain a suspension of catalytically active skeletal particles. The size of the catalytically active particles is determined by their starting size in the starting alloy material. At this point, filtration or decantation may be used to concentrate the intermetallic particles if desired.

Next, an acidic material is added to the solution to reduce the pH to between about 6 and about 9. Concurrently salts (based on the cation of the caustic constituent and the anion of the acidic material) and hydroxides (based on the matrix material) are formed. In the pH range of about 6 to 9, the result is a hydroxide gel which contains skeletal catalytic particles along with the previously mentioned salt constituent.

The gel, which is accompanied by salts and water, is treated to remove the salt and the excess water. Filtering and centrifuging may be used to remove the excess water and the salt which is dissolved in the water.

Subsequent washings with water followed by filtration and/or centrifuging may be used to further reduce the salt content. The resultant purified gel is then dried at a moderate temperature to remove water and is then calcined in a reducing atmosphere at an elevated temperature to convert the hydroxide into an oxide ceramic. The resultant oxide ceramic contains the finely dispersed skeletal catalyst particles. It may be used directly as a powdered catalyst material or may be treated as a ceramic material and formed into pellets and the like for specific applications.

The present invention may be better understood through reference to the following illustrative example.

EXAMPLE 10 grams of a powdered alloy consisting of 30 weight percent Pt bal Al is employed. This alloy consists of an aluminum matrix containing Al$_4$Pt particles whose diameter is about 5 microns. To react this amount of aluminum with sodium hydroxide to produce NaAlO$_2$ would require approximately 32 grams NaOH. Five times (160 gms) the stoichiometric amount of NaOH was used, dissolved in one liter of water to produce an approximately 4 Normal solution. This solution dissolves the entire aluminum matrix material and removed most of the aluminum portion of the Al$_4$Pt intermetallic compound producing the solution of sodium aluminate having the skeletal platinum particles in suspension with excess caustic and water. This highly basic solution is treated with 250 cc. of concentrated hydrochloric acid (12 Normal) to reduce the pH of the solution to about 8. The hydrochloric acid reacts with the sodium aluminate and water to produce an aluminum hydroxide gel and sodium chloride. This gel, aluminum hydroxide and sodium chloride, is then vacuum filtered to remove excess water (centrifugal techniques might also be employed). A substantial amount of the NaCl is also removed with the excess water. This gel is further washed with water to remove the remaining amounts of NaCl and again filtered. The essentially NaCl free gel is then dried at 110° C. to remove the water which is tied up in the gel and is then calcined at 600° C. in hydrogen atmosphere to convert the aluminum hydroxide to alumina. The resultant product consists of 3 grams of finely divided skeletal platinum dispersed in 13.2 grams of alpha alumina. This product has catalytic utility in both its naturally occurred powder form and can also be formed into other shapes such as pellets by the addition of a small amount of binder followed by conventional ceramic processing techniques.

We claim:

1. A process for producing a supported skeletal catalytic material including the steps of:
    a. providing a starting material which has a microstructure which includes a solid solution matrix based on a material selected from the group consisting of Al and Si, and alloys and mixtures thereof, and which contains discrete intermetallic particles of a compound between the predominant element of the matrix phase and a catalytically active metal or alloy;
    b. dissolving the matrix in an aqueous caustic solution to produce a compound between the caustic material cation and the matrix material, with the evolution of hydrogen, with the reaction conditions being such that a substantial amount of excess caustic and water remain at the conclusion of the dissolution step, said dissolving process also being effective to remove at least a portion of the non-catalytic element from the intermetallic particles so as to produce skeletal catalytic particles;

c. adding an acidic material to reduce the pH of the solution to between about 6 and about 9, with the concurrent formation of salts (based on the cation of the caustic constituent and the anion of the acidic material) and hydroxides (based on matrix material) to produce a hydroxide gel, said gel also containing the skeletal catalytic particles;

d. washing the gel to effectively remove the salt constituent;

e. drying the gel to remove the water;

f. calcining the dried gel in a reducing atmosphere to produce an oxide ceramic based on the original matrix material which contains dispersed skeletal catalytic particles.

2. The supported skeletal catalyst made according to claim 1.

3. A method as in claim 1 wherein during step C the material is agitated so as to improve the dispersion of the skeletal catalytic particles.

* * * * *